Aug. 25, 1936. J. W. LOGAN, JR 2,052,200
COMBINED FRICTION AND ELECTRIC BRAKE
Filed Nov. 7, 1933
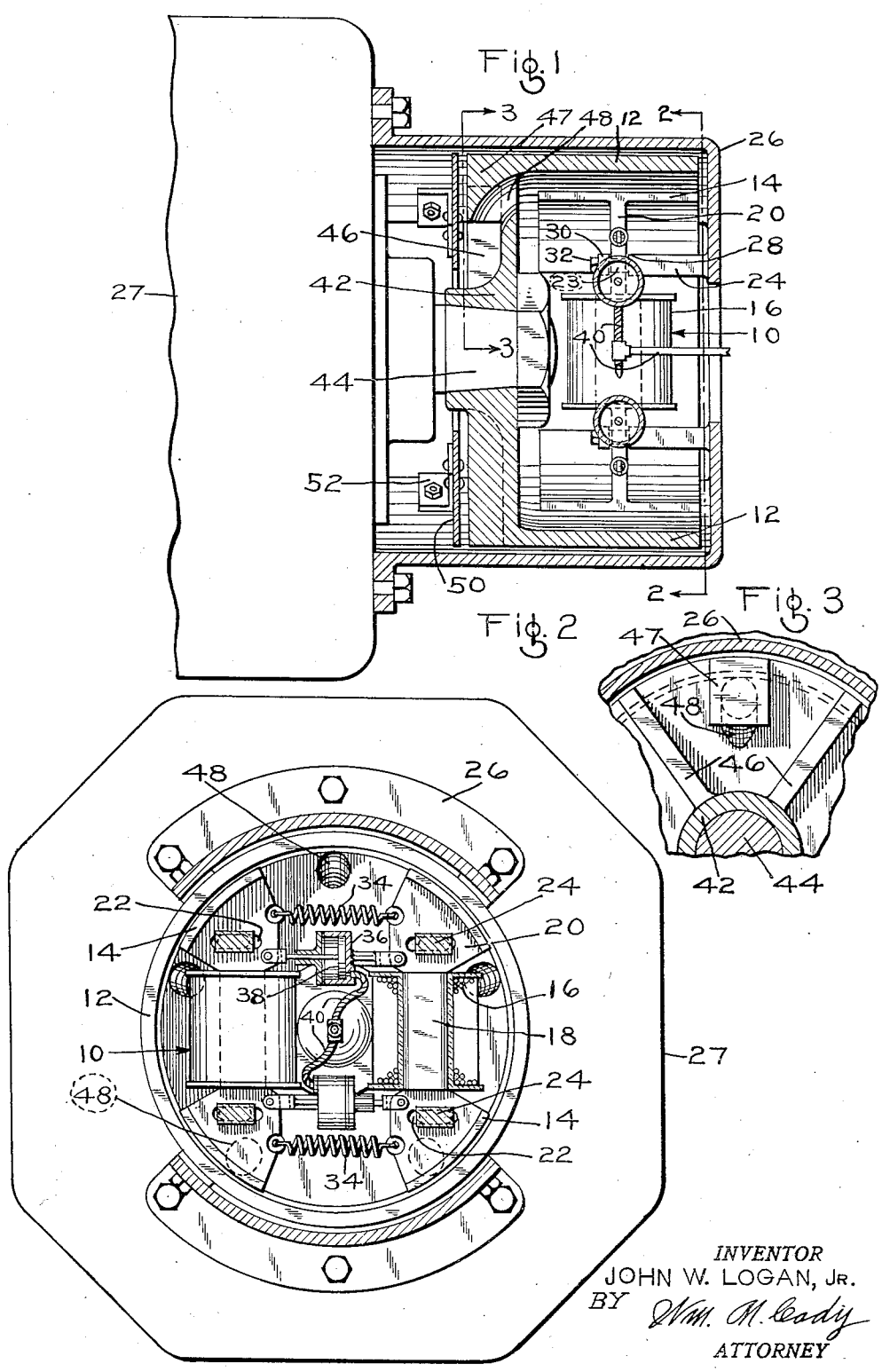
INVENTOR
JOHN W. LOGAN, JR.
BY
ATTORNEY

UNITED STATES PATENT OFFICE 2,052,200

COMBINED FRICTION AND ELECTRIC BRAKE

John W. Logan, Jr., Wilkinsburg, Pa., assignor to The Westinghouse Air Brake Company, Wilmerding, Pa., a corporation of Pennsylvania Application November 7, 1933, Serial No. 696,994

7 Claims. (Cl. 188—156)

This invention relates to a vehicle brake, and in particular to a brake apparatus in which the braking action is produced by employing both a friction brake and an electro-dynamic brake effect.

In the braking of a vehicle, the coefficient of friction of a friction brake increases as the speed of the vehicle decreases, hence the rate of retardation increases as the vehicle slows down. In braking with an electro-dynamic brake, the rate of retardation, although holding fairly constant for the upper speeds, decreases as the speed of the vehicle decreases. By combining the effects of both the friction brake and the electro-dynamic brake a more uniform retardation is possible than is obtainable with either type of brake used independently.

It is, therefore, a general object of my invention to provide a combined friction and electro-dynamic brake apparatus in which, upon effecting an application of the brakes, there is produced both a friction braking action and an electro-dynamic braking action, acting together to provide the desired degree of braking force.

Another object is to provide a combined friction brake and electro-dynamic brake of the eddy current type, in which the eddy current braking action is more effective at a time when the friction braking action is less effective, and the friction braking action is more effective at a time when the eddy current braking action is less effective.

Still another object is to provide a combined brake apparatus of this type which acts upon the internal expanding brake principle, and in which internal expanding parts are actuated to effect both friction and eddy current braking.

A yet further object is to provide such a brake apparatus having simply arranged means for effecting cooling of the operating parts of the brake apparatus.

Further objects will be apparent from the following description, illustrated in the attached drawing, in which, Fig. 1 is an elevation in section of one embodiment associated with a vehicle motor.

Fig. 2 is a view along the line 2—2 of Fig. 1.

Fig. 3 is a fragmentary view, partly in section, along the line 3—3 of Fig. 1.

Referring now to the drawing, there is shown a brake apparatus in which friction brake elements are combined with electro-dynamic brake elements of the eddy current type, comprising stators or electro-magnets 10 mounted within a brake drum 12 and having brake shoes 14 for pole pieces, the brake drum 12 being also utilized as the rotor of the eddy current brake.

Each electro-magnet 10 comprises a winding 16 disposed on and insulated from a core element 18. The core element 18 is provided with pole pieces 20 of magnetic material, to which are secured in any suitable manner the brake shoes 14. The pole pieces 20 have slots 22 therein for receiving the reduced end portion 23 of the guiding supports 24. The supports 24 are secured to brackets 26, which may be in turn secured to any rigid surface, as the frame of a drive motor 27, as shown.

The supports 24 are preferably of non-magnetic material, such for example as copper or brass, and for the purpose of holding the electro-magnets 10 in alignment with each other and with the brake drum are provided with shoulders 28 and removable collars 30 held in place as by nuts 32. The slots 22 are large enough to permit movement of the electro-magnets 10 on the supports 24 toward and away from each other, as will more clearly hereinafter appear.

The brake shoes 14 have faces corresponding to the inner periphery of the brake drum 12, and it will be obvious that the electro-magnets 10 are movable on the supports 24 back and forth, so as to cause engagement between the brake shoes and the brake drum. The brake shoes and brake drum are preferably of magnetic material, such as iron or steel.

For holding the electro-magnets 10, and hence the brake shoes 14, in a biased position, I provide coil springs 34 connected to opposing electro-magnets in a manner to normally urge the two toward each other and away from the brake drum 14. The springs 34 are preferably of non-magnetic material, such as brass, copper or an alloy thereof.

To provide for emergency operation of the brake shoes 14, as will be hereinafter more fully described, there are provided brake cylinders 36, connected to one electro-magnet, as shown, and having pistons 38 connected to the opposing electro-magnet, as indicated. Fluid under pressure is supplied to the brake cylinders 36 by pipe and flexible tubing 40.

The brake drum 12 is shown as provided with a hub portion 42 rigidly secured to the shaft 44 of the driving motor 27, but it may be secured to any part which rotates as the vehicle moves.

For the purpose of securing a circulation of cooling air in and around the brake parts, I provide radial ribs 46 on the back side of the brake drum 12, extending between the hub portion 42 and the outer periphery of the drum. Between pairs of the ribs 46, there are provided projections 47 in which are ducts 48 leading from the back side of the drum, first radially through the projections 47 and then axially through the drum 12, to the interior of the drum adjacent the friction and electric brake parts heretofore described. A stationary baffle 50, in the form of an apertured disc, for forming pockets in connection with the ribs 46, for a purpose to be later indicated, is provided adjacent to and just clear of the ribs 46, and is secured to the brackets 26, as by angle supports 52.

In operation, when the brakes are held released, the parts of the brake apparatus are normally in the relative positions shown in the drawing. When it is desired to effect an application of the brakes to retard motion of a vehicle equipped therewith, current is supplied to the windings 16 in any well known manner, and to a degree corresponding to the desired degree of application of the brakes. When current flows in the windings 16 magnetic fluxes are established having paths including the core member 18, the pole pieces 20, the brake shoes 14 and the brake drum 12. The air gap between a brake shoe and the brake drum is relatively small, so that the shoe is attracted to the drum with an initial force corresponding to the degree of energization of the windings 16. Further, as the shoe moves toward the brake drum the force of attraction increases, due to the decreasing reluctance of the flux path as the air gaps are decreased during this movement. When the shoes engage the brake drum a friction braking effect is produced, and since the air gaps are now closed, this braking effect will thereafter be in accordance with the degree of current supplied the windings 16. The greater the current supplied to the windings 16 the greater will be the friction braking force.

Simultaneously with the producing of this friction braking force, the magnetic fluxes establish electric currents in the brake drum reacting with the fluxes to produce the well known electrodynamic or eddy current braking effect. The braking force corresponding to this effect is likewise in accordance with the degree of the current supplied the windings 16, so that both friction braking force and eddy current braking force are varied in accordance with the varying of the current supplied to energize the electro-magnets 10.

It is well known that the eddy current brake is most effective when braking a vehicle traveling at high speeds, while the friction brake is more effective at low speeds. Therefore, it will be obvious that, with my improved brake, in braking a vehicle from high speeds, the eddy current braking force will be particularly effective in initially retarding the vehicle, and as the vehicle slows down and the eddy current braking force diminishes the friction braking force increases, so that a resultant more nearly constant braking force is maintained over the entire period of deceleration of a vehicle if desired.

It is to be again noted that in controlling the application of a brake embodying my invention, it is only necessary to control the supply of current to the windings 16. This makes possible the use of relatively simple control apparatus and permits of a very wide range of degrees of application of the brakes.

After a vehicle has been brought to a stop, continued excitation of the windings 16 will, of course, hold the vehicle at rest, in the same manner as does any friction type brake.

In order to provide means for applying the brakes in case of an emergency, such as when electric power is interrupted, as by a trolley coming off, failure of power supply, etc., there is included the heretofore described fluid pressure apparatus. When fluid under pressure is supplied to the brake cylinders 36 it acts to cause the pistons 38 and the cylinders 36 to move in opposite directions, thereby moving the opposing electro-magnets 10 apart until the brake shoes 14 engage the brake drum 12, thus producing the desired braking effect. The application of the brakes by fluid under pressure can be made automatic upon interruption of electric power, or be entirely controlled at will.

When the brakes are applied while the vehicle is in motion the brake parts become heated. As the brake drum 12 rotates air will be sucked into the pockets formed by the ribs 46 of the brake drum and the baffle 50, from adjacent the hub portion 42 of the drum. This air is impelled radially outwardly, a large portion of it entering the ducts 48 and thence being directed axially over the inner surface of the drum and over the brake parts within the drum. In addition, the ribs 46 and the projections 47 serve to provide additional radiating surface for liberating the heat, so that a constant stream of cooling air is directed over practically all of the surface effective in liberating heat.

The windings 16 on opposing electro-magnets may be connected in series or parallel, and excited so that the north pole of one electro-magnet is adjacent the south pole of the other, thus producing the effect of four poles around the brake drum, or they may be excited so that the adjacent poles of each are of the same polarity, thus producing the effect of two poles around the brake drum. In practice I prefer the four pole arrangement, as it has been found that such produces a more nearly constant eddy current braking effect over a greater period of deceleration, without affecting the friction braking force.

By making the springs 34, the brake cylinders 36, and the guiding supports 24 of non-magnetic materials, such as those hereinbefore named, the magnetic fluxes produced by current in the windings 16 are confined to the parts active in effecting braking and not lost by leakage through inactive parts.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake apparatus, the combination with a rotatable braking member, of brake shoes, means providing for movement of said shoes toward and away from said member in a straight line, a magnetic element connecting said shoes, a winding disposed on said element and adapted when energized to produce a magnetic flux in said shoes effective to cause movement of said shoes toward said braking member to produce a combined friction and eddy current braking effect thereon, and fluid pressure operated means for actuating said brake shoes toward said braking member independently of energization of said winding.

2. In a vehicle brake apparatus, the combination with a rotatable braking member, of a plurality of brake elements, each of said elements being provided with brake shoes connected by a core member having disposed thereon a winding effective when energized to produce a magnetic flux in said shoes to cause attraction toward said braking member, resilient means connecting said brake elements and normally urging said elements away from said braking member, and fluid pressure means carried by said brake elements for actuating said brake elements toward said braking member independently of energization of said winding.

3. In a vehicle brake apparatus, the combination with a vehicle driving motor having a shaft, of a rotatable braking member secured to the end of said shaft and having an annular braking portion extending beyond the end of said shaft, a plurality of electromagnet devices within said annular braking portion, non-magnetic means associated with said motor for providing for slidable movement of said devices toward and away from said annular braking portion, each of said devices being provided with brake shoes connected by a core element having disposed thereon a winding which when energized is adapted to cause said shoes to be attracted toward said annular portion to produce a combined friction and eddy current braking effect thereon, non-magnetic resilient means for urging said devices away from said annular portion, and fluid pressure actuated means carried by said devices for also actuating said devices toward said annular portion.

4. In a vehicle brake apparatus, in combination, a vehicle driving motor having a shaft, a rotatable braking member secured to said shaft and having an annular braking portion, an electromagnet device within said annular braking portion having pole pieces in the form of brake shoes, a bracket secured to said motor, non-magnetic elements secured to said bracket for supporting said electromagnet device and providing for slidable movement of said electromagnet device toward and away from said rotatable braking member, said electromagnet device being attracted toward said rotatable braking member when energized, and resilient means normally urging said electromagnet devices away from said braking member.

5. In a vehicle brake apparatus, in combination, a magnetic brake drum, two electromagnet devices disposed within said drum, each of said devices having a magnetic core member terminating in magnetic brake shoes and having a winding disposed centrally on said core member adapted when energized to produce a magnetic flux causing said shoes to be attracted toward said drum, said core members having an elongated aperture on either side of said windings, non-magnetic elements projecting into said apertures and providing for slidable movement of said electromagnet devices, and non-magnetic springs connecting the shoes of one of said devices to the shoes of the other of said devices to urge said shoes away from said drum.

6. In a vehicle brake apparatus, in combination, a magnetic rotatable braking member having an annular braking portion, a plurality of electromagnets disposed within said annular braking portion, each of said electromagnets having a core member terminating in pole pieces in the form of brake shoes and having a winding disposed on said core member adapted when energized to produce a magnetic flux in said shoes effective in causing said shoes to be attracted toward said rotatable braking member, and two fluid pressure operated devices each of which has a cylinder connected to one of said electromagnets and a piston connected to the other of said electromagnets and being operable when fluid under pressure is supplied to said cylinder to actuate said electromagnet toward said braking member.

7. In a vehicle brake apparatus, in combination, a magnetic brake drum, two electromagnet devices disposed within said drum, each of said devices having a magnetic core member terminating in magnetic brake shoes and having a winding disposed centrally on said core member adapted when energized to produce a magnetic flux causing said shoe to be attracted toward said drum, two fluid pressure operated devices for actuating said two electromagnet devices in opposite directions and toward said brake drum, each of said fluid pressure operated devices having a cylinder connected to one of said electromagnet devices and a piston connected to the other of said electromagnet devices.

JOHN W. LOGAN, Jr.